(12) United States Patent
Filicicchia et al.

(10) Patent No.: US 10,071,390 B2
(45) Date of Patent: Sep. 11, 2018

(54) FLUIDIZED BED COATING APPARATUS

(71) Applicant: SPRAYING SYSTEMS CO., Wheaton, IL (US)

(72) Inventors: Daniel J. Filicicchia, Londonderry, NH (US); David C. Huffman, Merrimack, NH (US); Brian K. Smith, Roshelle, IL (US); Joseph P. Szczap, Naperville, IL (US)

(73) Assignee: Spraying Systems Co., Wheaton, IL (US)

( * ) Notice: Subject to any disclaimer, the term of this patent is extended or adjusted under 35 U.S.C. 154(b) by 0 days.

(21) Appl. No.: 14/435,317

(22) PCT Filed: Oct. 10, 2013

(86) PCT No.: PCT/US2013/064200
§ 371 (c)(1),
(2) Date: Apr. 13, 2015

(87) PCT Pub. No.: WO2014/059063
PCT Pub. Date: Apr. 17, 2014

(65) Prior Publication Data
US 2015/0258565 A1      Sep. 17, 2015

Related U.S. Application Data

(60) Provisional application No. 61/713,305, filed on Oct. 12, 2012.

(51) Int. Cl.
*B05C 19/02*       (2006.01)
*B05B 7/06*        (2006.01)
(Continued)

(52) U.S. Cl.
CPC .......... *B05B 17/0646* (2013.01); *B01J 2/006* (2013.01); *B01J 2/16* (2013.01); *B01J 2/18* (2013.01);
(Continued)

(58) Field of Classification Search
None
See application file for complete search history.

(56) References Cited

U.S. PATENT DOCUMENTS 3,241,520 A * 3/1966 Wurster .................... B01J 8/36
                                                118/303
3,694,675 A * 9/1972 Loveday ............... B06B 1/0618
                                                 310/26

(Continued)

FOREIGN PATENT DOCUMENTS

JP          61-259783 A2    11/1986

OTHER PUBLICATIONS

Search Report dated Aug. 3, 2016, in European Patent Application No. 13844871.7, filed Oct. 10, 2013.
(Continued)

*Primary Examiner* — Binu Thomas
(74) *Attorney, Agent, or Firm* — Leydig, Voit & Mayer, Ltd.

(57) ABSTRACT

A fluidized bed coating apparatus for coating liquid onto the surfaces of particles directed into a coating chamber. A liquid spray nozzle assembly disposed below a hollow separator within the coating chamber includes an ultrasonic atomizer for atomizing coating liquid into a fine liquid particle cloud and a pressurized air directing air cap for forming the ultrasonically atomized fine liquid particle cloud into a cone shaped spray pattern and propelling the liquid particles through the separator into an upbed region of the coating chamber for recirculation in an outbed region, and
(Continued)

through the separator. A cooling air passageway system is provided within the spray nozzle assembly for cooing the ultrasonic atomizer during operation.

10 Claims, 6 Drawing Sheets

(51) Int. Cl.

| | |
|---|---|
| *B05B 17/06* | (2006.01) |
| *B05B 17/00* | (2006.01) |
| *B01J 2/16* | (2006.01) |
| *B05B 7/14* | (2006.01) |
| *B05B 7/16* | (2006.01) |
| *B01J 2/00* | (2006.01) |
| *B01J 2/18* | (2006.01) |

(52) U.S. Cl.
CPC ............ *B05B 7/066* (2013.01); *B05B 7/1431* (2013.01); *B05B 7/1463* (2013.01); *B05B 7/16* (2013.01); *B05B 17/063* (2013.01); *B05B 17/0623* (2013.01); *B05C 19/02* (2013.01); *Y10S 118/05* (2013.01)

(56) References Cited

U.S. PATENT DOCUMENTS

| | | | | |
|---|---|---|---|---|
| 4,320,584 | A * | 3/1982 | Huttlin | B01J 8/1818 34/222 |
| 4,858,552 | A * | 8/1989 | Glatt | B01J 2/16 118/19 |
| 6,685,775 | B1 | 2/2004 | Jensen | |
| 2003/0196598 | A1 * | 10/2003 | Jones | B01J 2/006 118/303 |
| 2004/0250757 | A1 * | 12/2004 | Natsuyama | B01J 2/12 118/300 |
| 2006/0130748 | A1 | 6/2006 | Bender et al. | |
| 2008/0000419 | A1 * | 1/2008 | Bender | B05C 19/02 118/303 |
| 2010/0258648 | A1 * | 10/2010 | Filicicchia | B05B 17/063 239/4 |

OTHER PUBLICATIONS

Notice of Reasons for Rejection dated Oct. 17, 2017, in Japanese Patent Application No. 2015-536874, filed Oct. 10, 2013.

* cited by examiner

FLUIDIZED BED COATING APPARATUS

CROSS-REFERENCE TO RELATED APPLICATIONS

This patent application claims the benefit of U.S. Patent Application No. 61/713,305, filed Oct. 12, 2012, which is incorporated by reference.

FIELD OF THE INVENTION

The present invention relates generally to fluidized bed coating systems, and more particularly, to a coating system in which an atomized coating liquid is directed upwardly into a coating chamber within which particles to be coated are circulated between upbed and downbed regions by upwardly directed airflow streams.

BACKGROUND OF THE INVENTION

Fluidized bed coating systems are known in which particles to be coated are circulated by an upwardly directed airstream through an upbed of particulate material to be coated and downwardly through an annular surrounding outbed of particulate material. Atomized coating liquid is directed centrally into the upbed for coating the particles as they travel upwardly. Airflow is generated within the coating chamber by drawing air through an upper filtering apparatus which blocks the passage of coated particulate.

Figure 1:
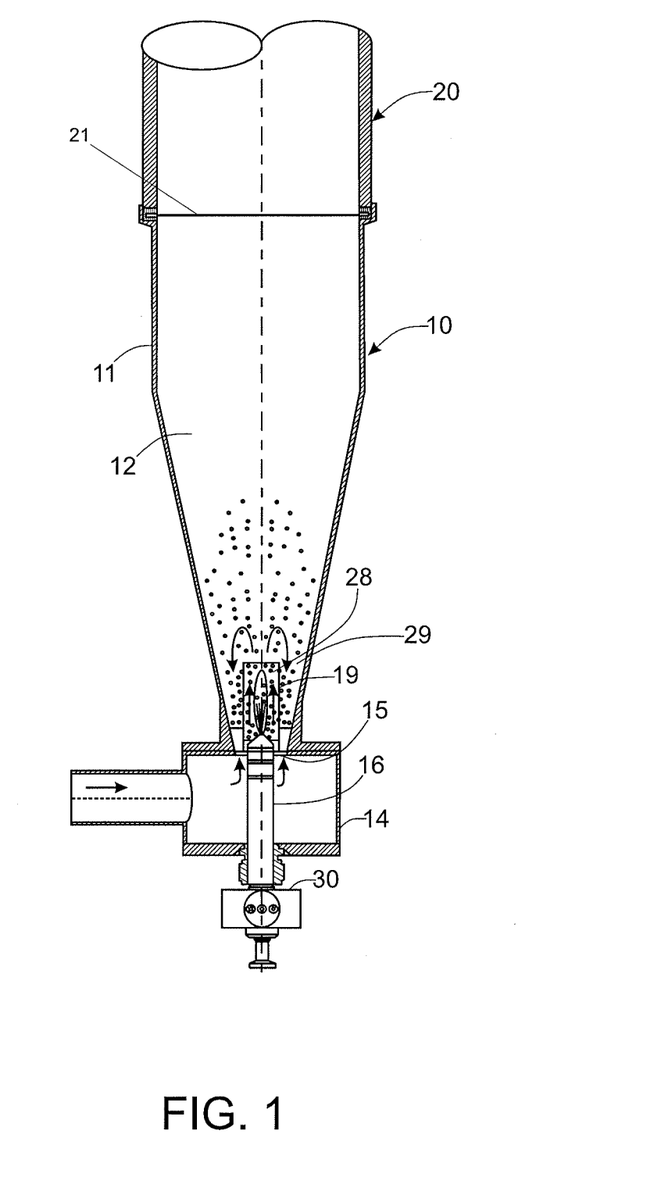
Figure 2:
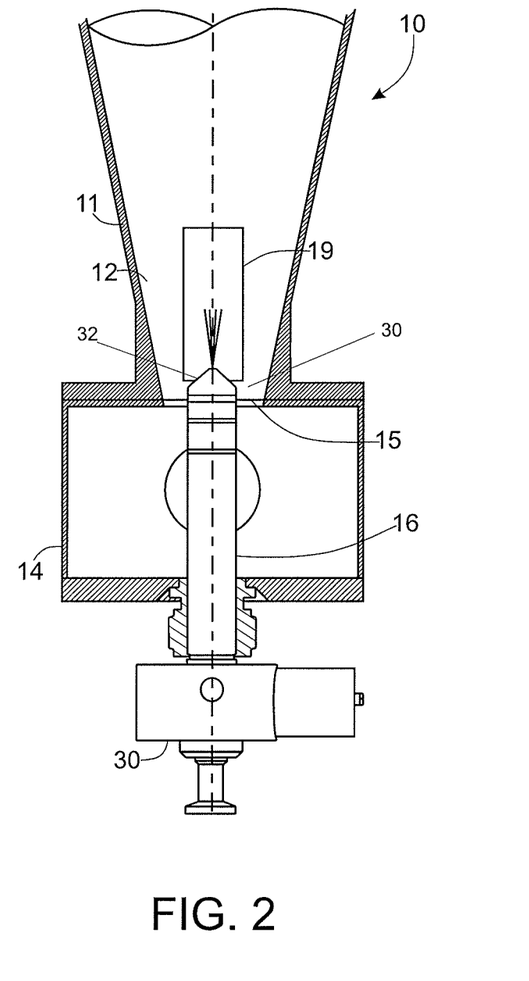
Figure 3:
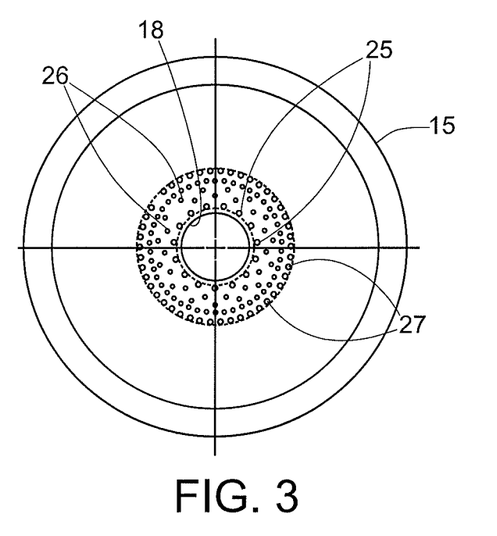
Figure 4:
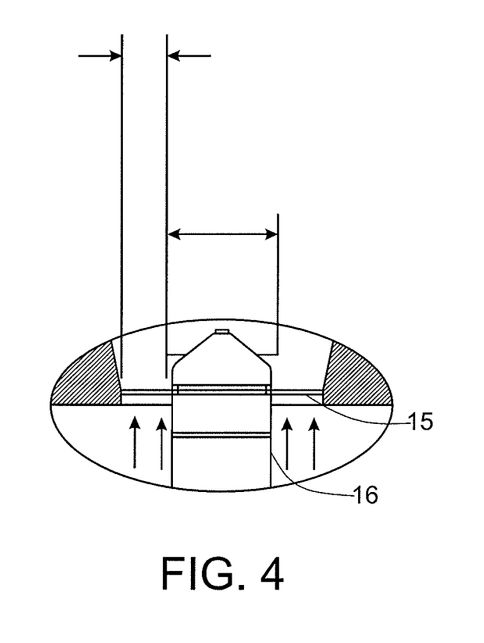
Figure 5:
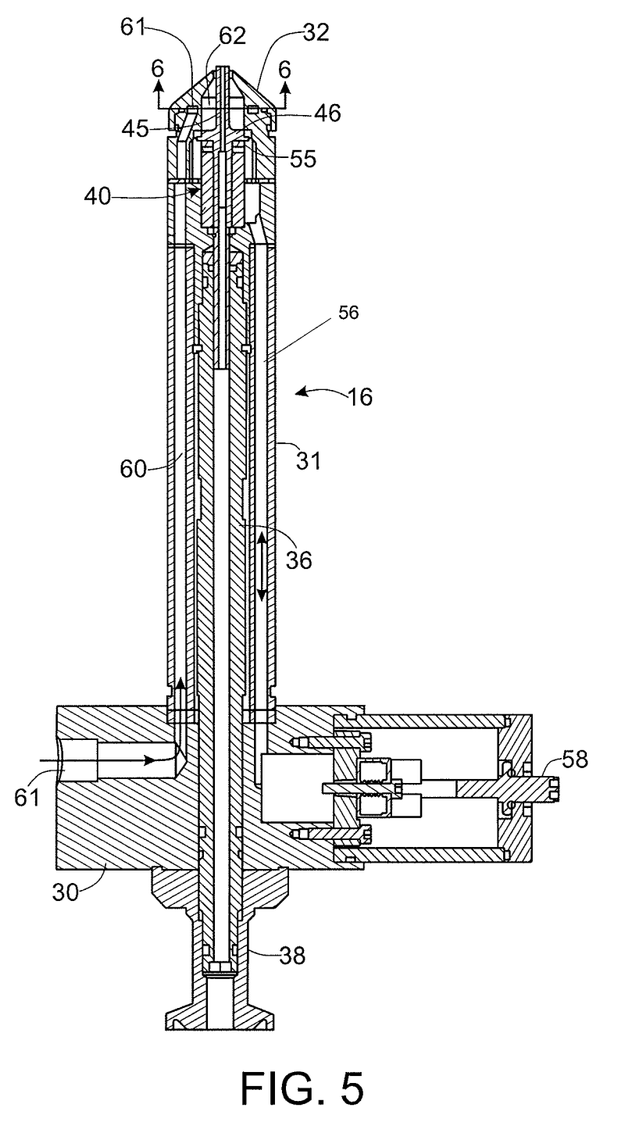

It is important in such fluidized bed coating systems that the coating fluid be atomized into as small of particles as possible to facilitate efficient coating without undesirable agglomeration of liquid onto the particles to be coated. For this purpose, it is known to utilize pressurized air assisted atomizing liquid spray nozzles which facilitate fine coating liquid particle breakdown.

A problem with such fluidized bed coating systems is that the energy of the pressurized air utilized in atomizing the coating fluid tends to propel the coating particles upward past the particulate matter to be coated such as to prevent effective and efficient coating. The energy of the pressurized air further tends to propel the coated particulate into the filter system at the upper end of the coating chamber, causing clogging, operating inefficiency, and the necessity for frequent cleaning. Lowering the pressure of the atomizing air to minimize such problems, on the other end, results in ineffective atomization and liquid particle breakdown necessary for optimum coating.

OBJECTS AND SUMMARY OF THE INVENTION

It is an object of the invention to provide a fluidized bed coating system adapted for more efficiently and effectively coating particulate matter with finely atomized coating fluid.

Another object of a fluidized bed coating system as characterized above in which a coating fluid is atomized and discharged into the coating chamber in a manner that facilitates more complete interaction and coating of the particulate matter.

A further object to provide a fluidized bed coating system of the foregoing type which is operable for atomizing the coating fluid into finer liquid particles and for controlling the discharging coating particles for optimum interaction with particulate matter in an upbed section of the coating apparatus.

Still another object to provide such a fluidized bed coating system in which the fluidized bed airflow streams circulate the particulate matter in the coating chamber with lesser tendency for clogging of the filter system.

Other objects and advantages of the invention will be apparent upon reading the following detailed description and upon reference to the drawings.

BRIEF DESCRIPTION OF THE DRAWINGS

FIG. 1 is a vertical section of an illustrative fluidized bed coating system in accordance with the invention;

FIG. 2 also is a vertical section of the illustrated fluidized bed coating system, taken in a plane ninety degrees offset from that of FIG. 1;

FIG. 3 is an enlarged plane view of the air control orifice disc of the illustrated coating system;

FIG. 4 is an enlarged fragmentary section of a discharge end of the ultrasonic nozzle of the illustrated system;

FIG. 5 is an enlarged vertical section of the ultrasonic spray nozzle of the illustrated system;

FIG. 6 is a transverse section of the illustrated spray nozzle taken in the plane of line 6-6 in FIG. 5;

FIG. 7 is a vertical section of the illustrated ultrasonic spray nozzle, taken in a plane ninety degrees offset from the vertical section of FIG. 5; and FIG. 8 is an enlarged fragmentary section of a discharge end of the illustrated spray nozzle.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the invention is to cover all modifications, alternative constructions, and equivalents falling within the spirit and scope of the invention.

DETAILED DESCRIPTION OF PREFERRED EMBODIMENT

Referring now more particularly to FIGS. 1-4 of the drawings, there is shown an illustrative fluidized bed coating apparatus 10 in accordance with the invention. The illustrated apparatus 10 is of a type commonly referred to in the industry as a Wurster bottom spray coating machine. The illustrated coating apparatus 10 basically comprises a fluid bed bowl or vessel 11 which defines an upwardly expanding, conical coating chamber 12, a lower air inlet plenum 14 for communicating process air to the coating chamber 12, an orifice plate 15 between the air inlet plenum 14 and coating chamber 12, a central liquid spray nozzle 16 projecting upwardly through a central opening 18 (FIG. 3) in the orifice plate 15, and a cylindrical separator 19 disposed in upstanding surrounding relation to a discharge end of the spray nozzle 16. It will be understood by a person skilled in the art that particulate matter to be coated may be introduced into the coating chamber from an appropriate port in the fluid bed bowl 11. A cylindrical blowback section 20 (FIG. 1) is mounted on top of the fluid bed bowl 11 and communicates in a known manner with an appropriate exhaust system, which draws air through the inlet plenum 14 into the fluid bed bowl 11, and from the fluid bed bowl 11 through a filter assembly 21, interposed between the blowback section 20 and the fluid bed bowl 11 to an exhaust plenum.

The orifice plate 15 includes an inner annular array of orifices 25 for communicating air from the inlet plenum 14 upwardly through the separator in immediately surrounding relation to a discharge end of the nozzle 16 and smaller diameter orifices 26 radially outwardly of the orifices 25 for communicating air upwardly into the coating chamber 12 outwardly of the cylindrical separator 19. The inner array of orifices 25, being larger in size than the outer orifices 26, will allow a higher volume and velocity of air from the inlet plenum 14 through the orifice plate 15 upwardly into the coating chamber 12, referred to as upbed air, for pneumatically transporting the particulate material upwardly past the spray nozzle 16 in an upbed region 28 (FIG. 1). The smaller sized orifices 26, radially outwardly of the orifices 25, allow sufficient airflow, referred to as downbed airflow, to penetrate the particulate matter in a downbed region 29 of the coating chamber 12 for maintaining the particulate matter in the downbed region in a near weightless suspension. This air causes the particulate matter in the downbed region 29 to behave somewhat like a fluid and travel downwardly in the downbed region 29 and horizontally though a transition gap 33 between the cylindrical separator 19 and the orifice plate 15 for redirection upwardly into the upbed region 28. The orifice plate 15 in this case includes an outermost annular array of orifices 27, larger than the orifices 26, for directing an outer annular airflow that prevents accumulation of particulate matter on the side wall of the bowl 11 in the down bed region.

As the particles rise upwardly in the high velocity upbed airstream, they contact droplets of coating liquid directed upwardly by the spray nozzle 16 and become coated before slowing down by the influence of gravity. The relatively high velocity upbed air stream forces the particles radially outwardly of the upbed region, and once away from the upstream lift provided by the upbed airstream, the particles fall within the bowl to the downbed region 29, eventually reaching the orifice plate 15 for recirculation into the upbed region 28.

To effect good coating of the particles, the coating fluid must be atomized into very fine liquid particles for direction into the upbed region 28, and for this purpose, pressurized air assisted spray nozzles commonly have been employed. As indicated above, however, the energy of the pressurized air directed to the spray nozzles tends to propel the liquid particles rapidly through the upbed region preventing effective coating of the particulate matter. Furthermore, the velocity can cause particles to become imbedded in the overhead filter, which impedes the filtering process and requires frequent cleaning.

In accordance with the present invention, the spray nozzle 16 ultrasonically atomizes the coating liquid into a very fine liquid particle discharge and is operable for controlling the spray discharge in a manner that enhances more effective and efficient coating of the particulate matter, and without clogging of the filter system. More particularly, the spray nozzle 16 atomizes the coating liquid without traditional pressurized air atomization and directs the liquid particles in a controlled fashion for enhanced interaction with the particulate matter in the upbed region of the coating chamber.

Figure 8:
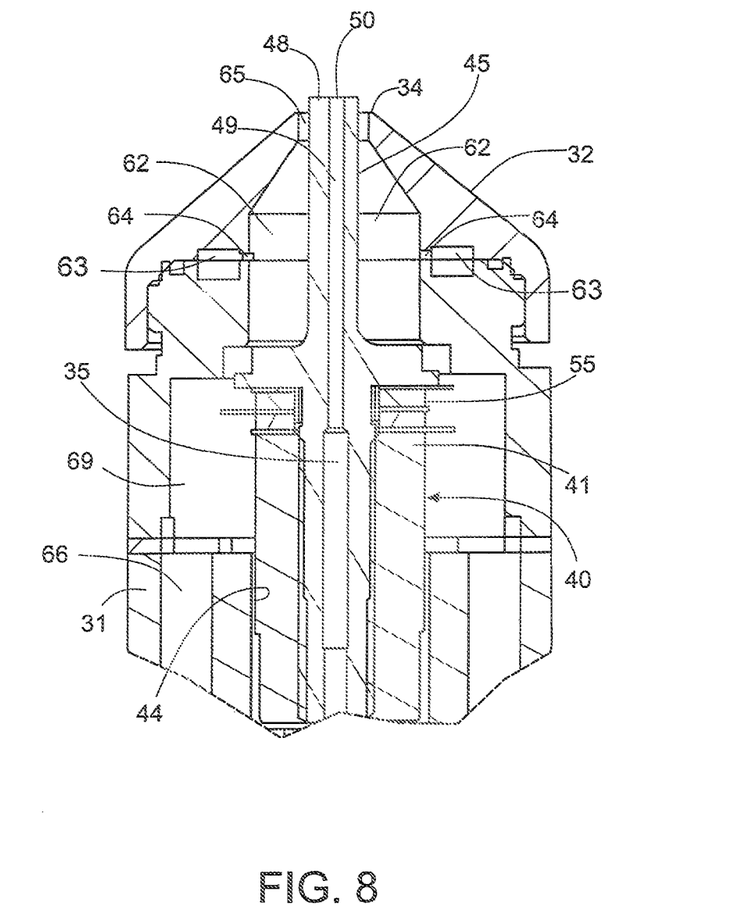

The illustrated ultrasonic nozzle 16, as best depicted in FIGS. 5-8, comprises an inlet body section 30 disposed below the air inlet plenum 14 and a nozzle body in the form of an outer cylindrical housing 31 extending through the inlet plenum 14 to the orifice plate 15. The nozzle 16 has an aircap 32 threadedly mounted on a downstream end of the cylindrical housing 31 in a lower end of the coating chamber 12. The aircap 32 in this case has a frustoconical or pyramid shape that terminates in a forward most planal apex 34 perpendicular to a central axis 35 of the spray nozzle 16 (FIG. 8). A coating fluid supply tube 36, having an inlet fitting 38 for coupling to a suitable liquid coating supply, extends through the inlet body section 30 and the cylindrical housing 31 along the central axis 35.

For ultrasonically atomizing liquid directed through the liquid inlet tube 36, the nozzle 16 includes an ultrasonic atomizer 40, which can be made of a suitable material such as titanium, disposed adjacent downstream end of the spray nozzle 16. The ultrasonic atomizer 40 in this case includes an ultrasonic cylindrical driver 41 supported within an internal cylindrical cavity 44 in a downstream end of the cylindrical housing 31 and a rod like cannular atomizer stem 45 having an enlarged base 46 disposed in axial spaced relation to driver 41. At an axially forward tip or end, the atomizer stem 45 terminates in an atomizing surface 48, and the cannular atomizer stem 45 has a central liquid passage 49 that communicates with the liquid supply tube 36 through the driver 41 and has a liquid exit orifice 50 in the atomizing surface 48 (FIG. 8).

To generate ultrasonic vibrations of the atomizing surface 48, the ultrasonic driver 41 includes a plurality of stacked piezoelectric transducer discs 55. In the illustrating embodiment, two piezoelectric transducer discs 55 are provided which are electrically coupled to an appropriate electronic generator via an electrical line in a raceway passage 56 in the cylindrical body section 31 and to an electrical communication port 58 in the inlet body section 30. As will be understood by one skilled in the art, the transducer discs 55 can be electrically coupled so that each disc 55 has an opposite or reverse polarity of an immediate adjacent disc. When electrical charge is coupled to the stack of piezoelectric discs 55, the discs 55 expand and contract against each other thereby causing the ultrasonic driver 41 to vibrate. The high frequency vibrations are transferred to the atomizing surface 48 via the atomizer stem 45, causing liquid present at the atomizing surface 48 to discharge in a cloud of extremely fine droplets or particles.

In carrying out the invention, the spray nozzle 16 is operable for forming the cloud of fine ultrasonically atomized liquid droplets into a well defined and controlled pattern for optimum interaction and coating of the particulate matter in the upbed region 29 of the coating chamber 12. To this end, the spray nozzle 16 is configured to communicate pressurized gas about the atomizing surface 48 in a manner that propels the atomized droplet cloud forwardly of the atomizing surface 48 in a controlled generally conical controlled pattern within the upbed region 28 for enhanced interaction with the circulating particulate matter within the upbed region 28. In the illustrated embodiment, the cylindrical nozzle body 31 is formed with a shaping air passage way 60 that communicates between a pressurized air inlet 61 in the inlet body section 30 to an annular manifold air chamber 63 about the atomizing stem 45 (FIG. 8). In the illustrated embodiment, the annular air manifold chamber 63 is defined between the aircap 32 and a downstream end face of the nozzle body 31.

Figure 6:
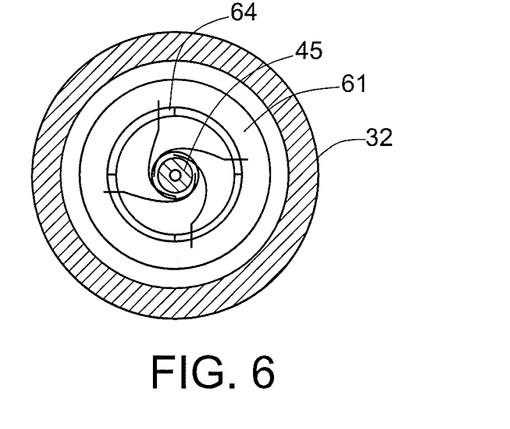
Figure 7:
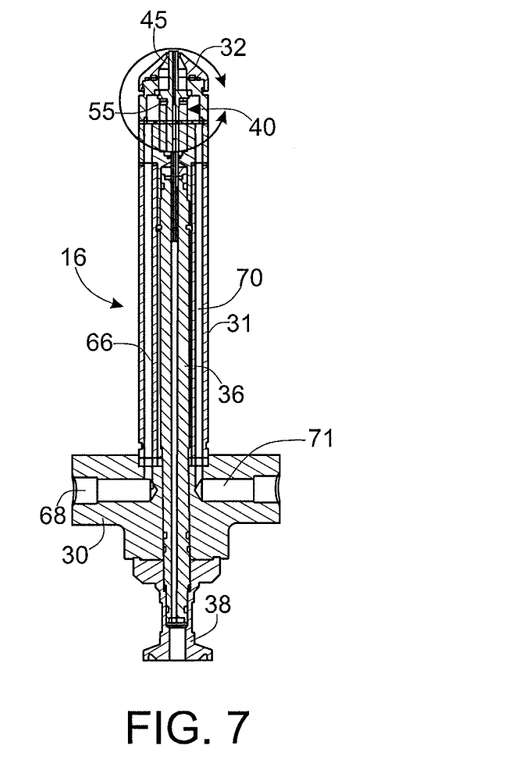

In further keeping with this embodiment, pressurized air communicates from the annular manifold chamber 60 into a hollow swirl chamber 62 about the atomizer stem 45 in a manner to create a tangential air flow within the swirl chamber 62 and through an annular air discharge orifice 65 between a central opening in the aircap 32 and the atomizer stem 45. In the illustrated embodiment, a plurality of circumferentially spaced passages 64 communicate between the manifold air chamber 60 and the swirl chamber 62 for creating a slight swirling action of pressurized air within the swirl chamber 62. The circumferentially spaced passageways 64 in this case are defined in the aircap 32 and are in radially offset relation to the atomizer stem 45, as shown in FIG. 6, such that the discharging airstreams are directed tangentially about of the atomizer stem 45. The tangentially directed air discharging from the annular air discharge orifice 65 surrounds the ultrasonically created cloud of liquid coating particles for controlling the forwardly directed pattern for interaction with surrounding upwardly moving particulate matter in the upbed region 28 of the coating chamber.

In keeping with a further aspect of the illustrated embodiment, for preventing overheating of the vibrating piezoelectric discs 55, the nozzle body 31 is formed with a cooling air passageway 66 which extends between a cooling air inlet 68 in the inlet body section 30 and an annular cavity 69 surrounding the discs 55 (FIG. 8). For facilitating circulation of cooling air about the discs 55, the nozzle body 31 is formed with a cooling air return passage 70 through an opposite side cylindrical body 31 for communicating with an outlet port 71. It will be seen that cooling air may be continually circulated through the cooling air passage 66, annular passage 68 and outlet port 71 for preventing overheating of the vibrating piezoelectric discs 55 during operation of the ultrasonic spray nozzle 16.

From the foregoing, it can be seen that the fluidized bed coating system of the present invention is adapted for more efficient and effective coating of particulate matter with very finely atomized coating fluid. The cloud of finely atomized coating fluid is controlled in a manner that facilitates complete interaction and coating of the particulate matter, without traditional air atomization of the coating fluid, and with lesser necessity for cleaning of the filter system.

It will be understated that the use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention.

A preferred embodiment of the invention is described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Moreover, any combination of the above-desired elements in all possible variations thereof is encompassed by the invention unless otherwise indicated herein or otherwise clearly contradicted by context. Accordingly, this invention includes all modifications and equivalents of the subject matter recited in the claims appended hereto as permitted by applicable law.

The invention claimed is:

1. A fluidized bed coating apparatus for coating liquid onto surfaces of particles comprising:
   a vessel that defines a coating chamber for receiving particles to be coated;
   said vessel having a processing air inlet for connection to a processing air supply for communicating processing air into an underside of said coating chamber;
   a filter on an upper side of said coating chamber;
   a coating liquid spray nozzle projecting upwardly toward said coating chamber from an underside thereof for spraying coating liquid upwardly into said coating chamber;
   a hollow separator disposed in upstanding relation relative to a discharge end of said coating liquid spray nozzle into which a coating liquid sprayed from said coating liquid spray nozzle is directed;
   said processing air inlet being operable for directing an upward processing air flow such that the particles to be coated are circulated upwardly through said separator to an upbed region of said coating chamber and then downwardly through a downbed region of the coating chamber outwardly of said separator for return into and through said separator;
   said coating liquid spray nozzle including an elongated housing, said elongated housing having a coating liquid supply passage extending through the housing with an upstream end coating fluid inlet for connection to a coating liquid supply;
   said coating liquid spray nozzle including an ultrasonic atomizer having an ultrasonic driver and a cannular atomizing stem supported adjacent a downstream end of said elongated housing, said cannular atomizing stem terminating in an atomizing surface and having a coating liquid flow passage extending along an axis of the stem communicating with said elongated housing liquid supply passage for directing coating liquid to said atomizing surface, said ultrasonic driver being electrically activatable to vibrate said atomizing surface for atomizing coating liquid directed onto the atomizing surface into a fine liquid particle cloud proximate the atomizing surface;
   said elongated housing having a forming air passage with an upstream forming air inlet end for connection to a forming air supply, an air cap mounted at a downstream end of said elongated housing defining an air chamber about said atomizing stem in fluid communication with said forming air passage, said air cap and atomizing stem defining a forming air discharge orifice communicating with said air chamber from which an air stream is emitted for forming the cloud of fine ultrasonically atomized liquid particles into a well-defined and controlled pattern short of the filter and without clogging the filter for optimum interaction and coating of particles in the upbed region of the coating chamber; and
   said coating liquid spray nozzle having an annular cavity surrounding said ultrasonic driver, said elongated nozzle housing having a cooling air passageway with an upstream cooling air inlet for coupling to a cooling air supply and for directing cooling air to said annular cavity for cooling said ultrasonic driver during operation of said coating liquid spray nozzle.

2. The fluidized bed coating apparatus of claim 1 including a processing air plenum disposed on an underside of said vessel for coupling to said processing air supply and for supplying processing air to said processing air inlet, said elongated nozzle housing extending through said air plenum with said forming air inlet, coating fluid inlet, and cooling air inlet being disposed outside said air plenum.

3. The fluidized bed coating apparatus of claim 2 in which said coating liquid spray nozzle has an inlet body disposed below and exterior to said air plenum, said forming air inlet, coating liquid inlet, and cooling air inlet communicate with said inlet body.

4. The fluidized bed coating apparatus of claim 1 in which said air cap is configured for directing pressurized air into said coating chamber in a rotary swirling direction for forming the ultrasonically atomized fine liquid particle cloud into a cone shaped spray pattern and propelling the liquid particles though said separator.

5. The fluidized bed coating apparatus of claim 1 including an orifice plate disposed between said processing air inlet and a lower end of said coating chamber, said orifice plate being formed with an inner array of orifices for communicating a relatively high volume of processing air upwardly through said separator and a second array of orifices outwardly of said separator for directing a relatively lower pressure air flow about an outer perimeter of said separator.

6. The fluidized bed coating apparatus of claim 5 in which the orifices of said inner array are sized larger than the orifices of said second array.

7. The fluidized bed coating apparatus of claim 5 in which said coating liquid spray nozzle is positioned in aligned relation to a central opening in said orifice plate with said air cap projecting outwardly of said central opening.

8. The fluidized bed coating apparatus of claim 7 in which said air cap has a frustoconical end protruding through said central opening.

9. The fluidized bed coating apparatus of claim 5 in which said orifice plate includes a third outermost annular array of orifices larger in size than the orifices of said second array for directing an outer annular air flow into said coating chamber for preventing accumulation of coated particles on a side wall of said vessel.

10. The fluidized bed coating apparatus of claim 1 in which said elongated nozzle housing includes a return air passage communicating with said annular cavity for communicating air from said annular cavity to an outlet port.

* * * * *